Feb. 11, 1958     C. E. SMITH ET AL     2,823,341
ELECTRIC MOTOR-BRAKE HOIST CONTROL SYSTEM
Filed Sept. 12, 1955     3 Sheets-Sheet 1

Inventors.
Eric Pell.
Charles E. Smith.
By H. R. Ratter
Attorney

Feb. 11, 1958   C. E. SMITH ET AL   2,823,341
ELECTRIC MOTOR-BRAKE HOIST CONTROL SYSTEM
Filed Sept. 12, 1955   3 Sheets-Sheet 3
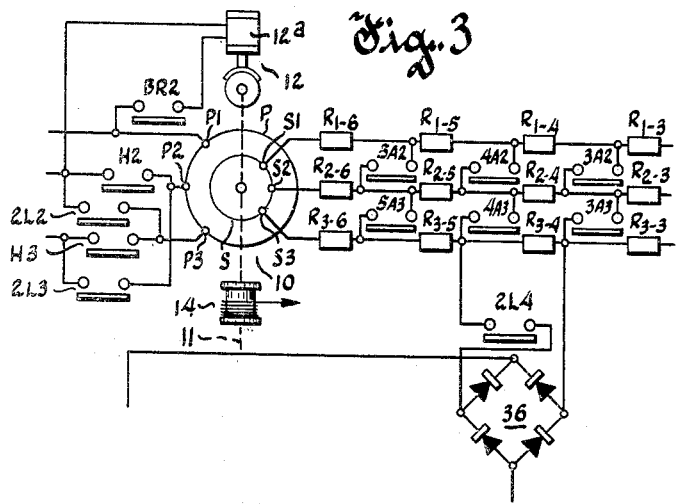
Fig. 3
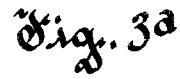
Fig. 3a
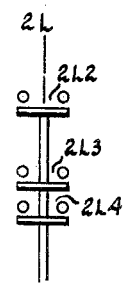
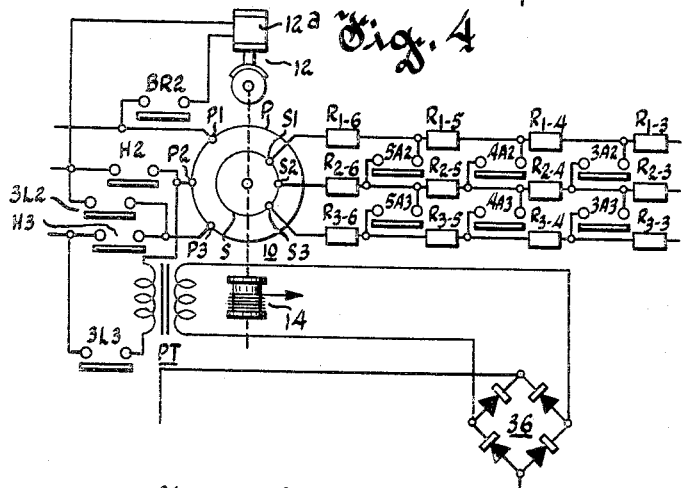
Fig. 4
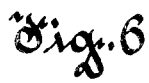
Fig. 6
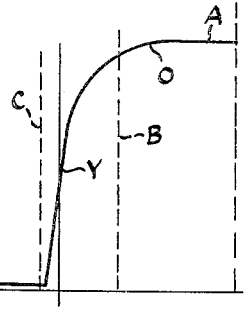
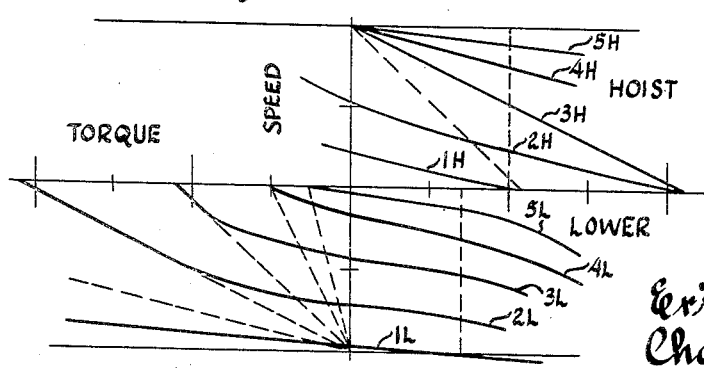
Fig. 5
Inventors.
Eric Pell
Charles E. Smith
By H R Rather
Attorney

United States Patent Office 2,823,341
Patented Feb. 11, 1958

2,823,341

ELECTRIC MOTOR-BRAKE HOIST CONTROL SYSTEM

Charles E. Smith, Milwaukee, and Eric Pell, Wauwatosa, Wis., assignors to Cutler-Hammer, Inc., Milwaukee, Wis., a corporation of Delaware Application September 12, 1955, Serial No. 533,844

6 Claims. (Cl. 318—203)

This invention relates to an electric motor-brake hoist control system.

The present invention relates to a type of control system disclosed in the Pell Patent No. 2,636,157, issued April 21, 1953, and is an improvement.

It is a primary object of the invention to provide an improved form of the aforementioned type of control system wherein simplified control of the electric brake is afforded both during hoisting and lowering operations of the hoist.

Another object of the invention is to provide for inherent maximum energization of the electric brake in event of failure of the regulating signal source.

Other objects and advantages of the invention will hereinafter appear.

The accompanying drawings illustrate certain preferred embodiments of the invention and will now be described in detail, it being understood that the embodiments illustrated are susceptible of modifications in respect of details without departing from the scope of the appended claims.

In the drawings:

Fig. 3 is a diagrammatic showing of a modification of the control system of Fig. 1;

Fig. 3a depicts a modified form of contactor used in Fig. 3;

Fig. 4 is a diagrammatic showing of another modification of the control system of Fig. 1;

Figure 1:
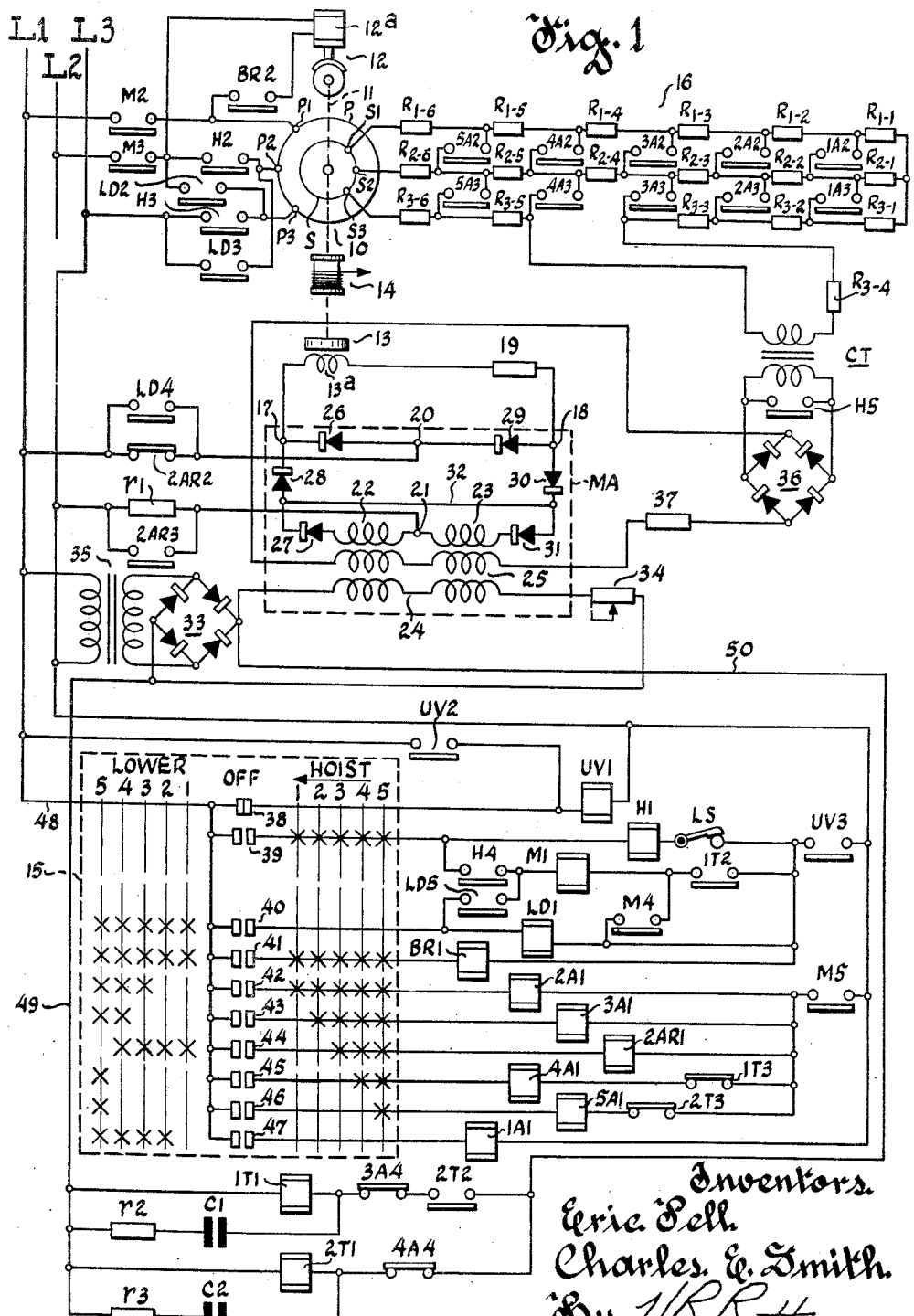
Figure 1 is a diagrammatic showing of a hoist control system embodying the invention.

Fig. 5 graphically depicts speed-torque characteristics afforded by the control systems embodying the invention, and Fig. 6 graphically depicts the operating characteristics of a magnetic amplifier employed in the control system of Figs. 1, 3 and 4.

In the embodiment of the invention shown in Fig. 1, an alternating current induction motor 10, preferably of the slip ring type, is used. Mounted on one end of the motor shaft 11 is a friction brake 12 having an electroresponsive release winding 12a, and mounted on the other end of the shaft is a torque resisting or electric load brake 13 which has an energizing winding 13a. A hoisting device 14 upon which a line sustaining a load is wound and unwound is also mounted on shaft 11.

The primary P of motor 10 is supplied from A. C. power supply lines L1, L2 and L3 through closure of contacts M2 and M3 of an electroresponsive main contactor M, in conjunction with closure of either contacts H2 and H3 of an electroresponsive hoist contactor H, or through contacts LD2 and LD3 of an electroresponsive lowering contactor LD; the control of contacts M, H and LD being directed by a conventional drum controller enclosed within the dotted line rectangle 15.

Secondary S of motor 10 is connected to a resistance network 16 having three star connected phase branches. One branch comprises six series connected resistors $R_{1-1}$ to $R_{1-6}$, a second branch comprises six series connected resistors $R_{2-1}$ to $R_{2-6}$, and a third branch comprises six series connected resistors $R_{3-1}$ to $R_{3-6}$. Electroresponsive contactors 1A, 2A, 3A, 4A and 5A, whose energization is controlled by controller 15, are provided to commutate resistors out of said network in steps. As will be apparent, upon energization of any one of the last mentioned contactors, their respective contacts, similarly designated with the addition of postscripts "2" and "3" (for example 1A2 and 1A3), will close to effectively short out the resistors in the network to the right of each such set of contacts. The resistor $R_{1-2}$ is preferably three times the ohmic value of corresponding resistors $R_{2-2}$ and $R_{3-2}$ of the other branches to provide a step of unbalanced secondary resistance as will be hereinafter more fully explained.

Energizing windings 13a of brake 13 is connected to output terminals 17 and 18 of a self-saturating magnetic amplifier MA in series with a resistor 19. Amplifier MA comprises A. C. input terminals 20 and 21, main power windings 22 and 23 and D. C. reference and signal windings 24 and 25, respectively. A half-wave rectifier 26 is connected between input terminal 20 and output terminal 17. Winding 22 is connected between input terminal 21 and output terminal 17 in series with half-wave rectifiers 27 and 28. Output terminal 18 is connected to input terminal 20 through half-wave rectifier 29, and is connected to input terminal 21 in series with half-wave rectifiers 30 and 31 and winding 23. The common point between rectifiers 27 and 28 is connected through a conductor 32 to the common point between rectifiers 30 and 31. Reference winding 24 is connected at one end to an output terminal of a full-wave rectifier bridge 33, and is connected at its other end in series with an adjustable resistor 34 to the other output terminal of rectifier bridge 33. The input terminals of rectifier bridge 33 are connected to the secondary of a transformer 35 which has its primary connected across lines L1 and L3 of the A. C. supply. Signal winding 25 is connected across the output terminals of a full-wave rectifier bridge 36 in series with a resistor 37. The A. C. input terminal of rectifier bridge 36 is connected to the secondary of a current transformer CT which has its primary connected in series with resistor $R_{3-4}$ in a phase branch of secondary resistance network 16.

Input terminal 20 is connected to A. C. supply line L1 through normally closed contacts 2AR2 of an electroresponsive relay 2AR and is alternatively connectable to such supply line upon closure of normally open contacts LD4 of lowering contactor LD. Input terminal 21 is connected in series with a resistor r1 to A. C. supply line L3 and is alternatively directly connectable to the latter supply upon closure of normally open contacts 2AR3 of relay 2AR. As will be hereinafter more fully explained such connections of input terminals 20 and 21 provide full voltage, reduced voltage and interruption of all A. C. voltage to such input terminals.

It may be assumed that the polarity of the unidirectional voltage applied across reference winding 24 is in a direction to turn amplifier MA on, and the magnitude of such voltage is preferably adjusted so that the ampere turns developed by winding 24 will turn the amplifier on to the point on the amplifier output curve "O" of Fig. 6 defined by the intersection of the broken vertical line "B" with such curve. Further, it may be assumed that the unidirectional voltage applied across signal winding 25 will be in such a sense that the ampere turns developed by winding 25 will act differentially with respect to those developed by reference winding 24 and thus tend to turn the amplifier "off."

The control system additionally comprises a brake release relay BR, an undervoltage relay UV, timing relays 1T and 2T and a limit switch LS, whose connections will be hereinafter described in conjunction with controller 15.

Controller 15 is provided with ten contact sets 38 through 47, respectively. Corresponding contacts of each set are connected to A. C. supply line L1 through a conductor 48. Contacts 38 are closed in the "off" position of the controller and open in all other operating positions thereof. When contacts 38 are closed an energizing circuit is completed for operating coil UV1 of relay UV across supply lines L1 and L3, to thereby close normally open contacts UV2, which provides a maintaining circuit for coil UV1 around contacts 38, and to close normally open contacts UV3. The other contacts 39 through 47 are open in the "off" position and are closed in the operating positions in the "Hoist" and "Lowering" directions as specifically indicated by an "X" for each such position on the development layout for the controller.

Timing relay 1T has one end of its winding 1T1 connected to a conductor 49, which is connected to an output terminal of rectifier bridge 33, and has its other end connected in series with normally closed contact 3A4 of contactor 3A and normally open contacts 2T2 of timing relay 2T to a conductor 50 which is connected to the other output terminal of rectifier bridge 33. A timing discharge circuit, comprising a resistor r2 and a capacitor C1, is connected in series across coil 1T1. The operating coil 2T1 of timing relay 2T is connected across conductors 49 and 50 in series with normally closed contacts 4A4 of contactor 4A. A timing discharge circuit, comprising a resistor r3 and a capacitor C2, is connected in series across coil 2T1. As will be apparent, coil 2T1 will be energized whenever lines L1 and L3 are energized and contacts 4A4 are closed, and will be deenergized with time delay depending on the time constant of its discharge circuit following the opening of contacts 4A4. When coil 2T1 is energized, its contacts 2T2 are closed and its contacts 2T3 are opened. Closure of contacts 2T2 completes the energizing circuit for coil 1T1 of timing relay 1T, which when energized affords closure of its contacts 1T2 and opening of its contacts 1T3.

Contacts 39 of controller 15, when closed in each of the operating positions in the "Hoist" direction, complete an energizing circuit for coil H1 of hoist contactor H through limit switch LS and the then closed contact UV3 of undervoltage relay UV. Energization of coil H1 results in closure of its contacts H2, H3 to close the hoist direction contactors to terminals P2 and P3 of the motor primary, and in the closure of its contacts H4 to complete an energizing circuit for coil M1 of main contactor M, through the then closed contacts 1T2 and UV3 to thereby complete the motor primary connectors to cause this motor 10 to operate in the hoist direction. Closure of contacts M4 provide a maintaining circuit for coil M1 around contacts 1T2.

Contacts 40 of controller 15 are closed in all five lowering positions of the latter to provide an energizing circuit for coil LD1 of lowering contactor LD through the then closed contacts UV3. Energization of coil LD1 results in the closure of contacts LD2 and LD3 to complete directional connections to primary terminals P3 and P2, and in closure of contacts LD5 to complete an energizing circuit for coil M1 of main contactor M through the then closed contacts 1T2 and UV3, to thereby complete the motor primary connection to cause motor 10 to operate in the lowering direction.

Contacts 41 of controller 15 are closed in all hoist and lowering positions of the latter to provide an energizing circuit for coil BR1 of brake relay BR through UV3. Energization of coil BR1 effects closure of contacts BR2, and upon closure of contacts M2 and M3 of main contactor M, brake release winding 12ª of the friction brake 12 is energized to release the latter.

Contacts 42 of controller 15 are closed in all operating positions in the hoist direction and in the third through the fifth operating positions of the controller in the lowering direction to provide an energizing circuit for coil 2A1 of contactor 2A through the then closed contact M5 of main contactor M. Energization of coil 2A1 results in closure of contacts 2A2 and 2A3 to short out all resistors to the right thereof in the motor secondary resistance network 16.

Contacts 43 are closed in the second through fifth operating positions in the hoist direction and in the fourth and fifth operating positions in the lowering direction of controller 15 to provide an energizing circuit for coil 3A1 through the then closed contact M5. Energization of coil 3A1 results in closure of contacts 3A2 and 3A3 to short out all resistors to the right thereof in the motor secondary resistance of network 16. Contacts 3A4 also open to interrupt the energizing connections for coil 1T1 of timing relay 1T.

Contacts 44 are closed in the third through fifth operating positions in the hoist direction and in the first through fourth operating positions in the lowering direction of controller 15 to complete an energizing circuit for coil 2AR1 of relay 2AR through the then closed contact M5. Energization of coil 2AR1 results in opening of contacts 2AR2 and closure of contact 2AR3. Thus it will be observed that in the first and second hoist positions of controller 15 resistor r1 will be inserted in the A. C. supply connections to the input terminals of amplifier MA to provide a reduced magnitude of alternating voltage, and in the third through fifth hoist positions the A. C. supply to the amplifier will be disconnected thereby rendering the latter ineffective. Further, it will be observed that in the first through fourth lowering positions (contacts LD4 then being closed) the maximum magnitude of A. C. voltage will be supplied to amplifier MA, and that in the fifth lowering position, due to the opening of contact 2AR3, resistor r1 will be inserted to afford a reduced magnitude of alternating voltage to the amplifier.

Contacts 45 are closed in the fourth and fifth operating positions in the hoist direction and in the fifth operating position in the lowering direction to complete an energizing circuit to one end of coil 4A1 of relay 4A. The energizing circuit to the other end of coil 4A1 through the then closed contacts M5 is completed by reclosure of contact 1T3 which is subject to time delay deenergization of coil 1T1 resulting from the aforementioned opening of contacts 3A4. Thus a predetermined time delay is afforded between closure of contacts 3A2 and 3A3 of relay 3A and contacts 4A2 and 4A3 of relay 4A. Closure of contacts 4A2 and 4A3 shorts out all resistors to the right thereof in network 16.

Closure of contacts 46 in the fifth operating positions in both the hoisting and lowering directions completes the energizing circuit to one end of coil 5A1 of relay 5A. The energizing circuit to the other end of coil 5A1 through the then closed contact M5 is completed by reclosure of contacts 2T3, which is subject to time delay deenergization of coil 2T1 of timing relay 2T, resulting from the opening of contacts 4A4 which occurs when coil 4A1 is energized. Thus another predetermined time delay is afforded between the closure of contacts 4A2 and 4A3 and contacts 5A2 and 5A3. Closure of contacts 5A2 and 5A3 shorts out all resistors to the right thereof in secondary resistance network 16.

Closure of contacts 47 in the second through fifth lowering positions completes the energizing circuit for coil 1A1 of relay 1A to effect closure of contacts 1A2 and 1A3 and consequent shorting out of the resistors in network to the right of such contacts in network 16.

It will be observed that in the event of low voltage relay UV will drop out to open contacts UV2 and UV3, thereby requiring operation of controller 15 to "off" position before the main contactor M, hoist contactors H and lowering contactors LD can again be picked up. Such under voltage protection is of course old and well known. The inclusion of contacts 1T2 in the initial energizing connections for coil M1 of contactor M insures that contactor M will not pick up in the event either relay 1T or 2T fail to pick up. The inclusion of contact M5 in the energizing connections to contactors 1A through 5A and relay 2AR insures that none of the latter can be energized until main contactor M picks up.

From the foregoing it will be apparent that in the first hoist position of the controller winding 13$^a$ of brake 13 will be energized at a relatively low level as determined by the reduced alternating voltage input to amplifier MA and by the fixed ampere turns developed by reference winding 24 of the amplifier. In all hoist operating positions auxiliary contacts H5 are closed thus effectively shorting out the connection of current transformer CT with rectifier bridge 36. Thus in the first hoist position a corresponding relatively low fixed retarding torque will be exerted by brake 13 on the shaft 11. Accordingly, the resultant speed torque characteristic for the motor-brake connection will be similar to that depicted by the curve 1H in Fig. 5.

With controller 15 in its second hoist position, the retarding torque afforded by brake 13 will be the same amount afforded in the first hoist position. However, as contactor 3A is energized to short out the resistors $R_{1-3}$, $R_{2-3}$ and $R_{3-3}$ from the motor secondary resistance network 16, the speed-torque characteristic of the motor will change so that the resultant speed-torque characteristic of the motor-brake construction will be like that depicted by the curve 2H in Fig. 5

As aforedescribed relay 2AR is energized in the third through fifth hoist positions of controller 15 so that contacts 2AR2 will be open thereby deenergizing amplifier MA. Accordingly, brake 13 will be deenergized in the third through fifth hoist positions, and the speed-torque characteristics of the motor acting alone will be similar to those depicted by curves 3H, 4H and 5H of Fig. 5.

In all lowering operating positions of controller 15 contacts H5 of contactor H will be open and accordingly current transformer CT, acting through rectifier bridge 36, will be effective to supply signal winding 25 of amplifier MA with a rectified alternating voltage which is proportional to motor secondary current. In each of the first through fourth operating positions of controller 15 contacts LD4 and 2AR3 will be closed thus affording supply of maximum magnitude of alternating voltage to amplifier MA. It may be assumed that the level of ampere turns developed by reference winding 24 is so adjusted that the variation in ampere turns developed by signal winding 25 required to vary the output of amplifier MA between minimum and maximum corresponds to a variation in motor secondary current between 100% and 75% rated value. In other words, below 75% rated motor secondary current the output of amplifier MA will be at a maximum, will vary between maximum and minimum output in accordance with variation in motor secondary current between 75% and 100% rated value, and at 100% rated motor secondary current or above its output will be held at minimum value. Thus as depicted on curve "O" of Fig. 6, the intersection of the broken vertical line "B" with such curve corresponds to a condition of 75% rated motor secondary current and the intersection of broken line C corresponds to a condition of 100% rated motor secondary current; the substantially straight line position "Y" of curve "O" between lines B and C defining the regulating range of the amplifier.

With controller 15 operated to its first point lowering position, all resistors will be effectively included in the secondary resistance network 16, and it may be assumed that the portion of the motor secondary current flowing in the phase containing current transformer CT at zero motor speed is 25% rated value. Thus as the motor secondary current decreases with speed, and since a secondary current of 75% of rated value (or higher) is required to decrease the output of amplifier MA below maximum value, brake 13 will be energized at a maximum for all motor speeds up to synchronous speed. Accordingly, as maximum retarding torque will be exerted on shaft 11, the resultant speed-torque for the motor-brake combination will be like that depicted by curve 1L in Fig. 5.

When controller 15 is operated to its second lowering position contactor 1A will be energized to close its contacts 1A2 and 1A3 to short out resistors $R_{1-1}$, $R_{2-1}$ and $R_{3-1}$ from the resistance network 16. Thus, as resistor $R_{1-2}$ is unbalanced with respect to resistors $R_{2-2}$ and $R_{3-2}$, the equivalent resistance of network 16 may then be assumed to be on the order of 200%

$$\frac{E}{\sqrt{3}I}$$

Consequently, the secondary current flowing in the phase containing transformer CT will be of such value at zero motor speed that the output of amplifier MA will be at some intermediate value in the regulating range of the amplifier and its output will increase with motor speed. The resultant speed-torque characteristic of the motor-brake combination will be like that depicted by curve 2L in Fig. 5.

In the third point lowering position of controller 15 contactor 2A is energized to close its contacts thereby effectively shorting out resistors $R_{1-2}$, $R_{2-2}$ and $R_{3-2}$ from motor secondary resistance network 16. It may be assumed that the equivalent resistance is on the order of 95%

$$\frac{E}{\sqrt{3}I}$$

Thus, the secondary current flowing is the phase branch containing current transformer CT will be such that the output of amplifier MA, and consequently the energization of brake 13, will be held at minimum value until the motor speed reaches 20% synchronous speed and will thereafter increase toward maximum value with increase in motor speed above that value. The resultant speed-torque characteristic of the motor-brake combination will be in accordance with curve 3L of Fig. 5.

When controller 15 is in its fourth point lowering contactor 3A is energized to close its contacts 3A1 and 3A2 to effectively short out resistors $R_{1-3}$, $R_{2-3}$ and $R_{3-3}$ from the motor secondary resistance network 16. It may be assumed that the equivalent secondary resistance is on the order of 47%

$$\frac{E}{\sqrt{3}I}$$

Thus energization of brake 13 is delayed until the motor speed is up to 50% synchronous speed and thereafter its energization increases with increase of motor speed. The resultant speed-torque characteristic of the motor-brake combination will be like that depicted by curve 4L in Fig. 5.

In the fifth lowering position of the controller contactors 4A and 5A are energized to close the contacts 4A2, 4A3, 5A2 and 5A3 to effectively short out resistors $R_{1-4}$, $R_{1-5}$, $R_{2-4}$, $R_{2-5}$, $R_{3-4}$ and $R_{3-5}$, from motor secondary resistance network 16. It may be assumed that the equivalent secondary resistance is then on the order of 8%

$$\frac{E}{\sqrt{3}I}$$

Relay 2AR is deenergized thus opening its contacts 2AR3 to insert resistor r1 in the A. C. supply connectors to amplifier MA, which may be assumed to reduce the maximum output of amplifier MA to 30% of that afforded when the full magnitude of alternating voltage is supplied to it. As transformer CT will be deenergized, due to shorting out of resistor $R_{3-4}$ and $R_{3-5}$, the output of amplifier MA will be at a small constant value to provide a corresponding constant excitation of brake 13. The resultant speed-torque characteristic of the motor-brake combination will be in accordance with the curve 5L of Fig. 5.

If preferred corresponding resistors in each phase branch of the secondary resistance network may be of equal value, but in that event a rather low regulating action of amplifier MA will be afforded in the second lowering position of controller as the zero motor speed secondary current will be below 75% rated value.

Figure 2:
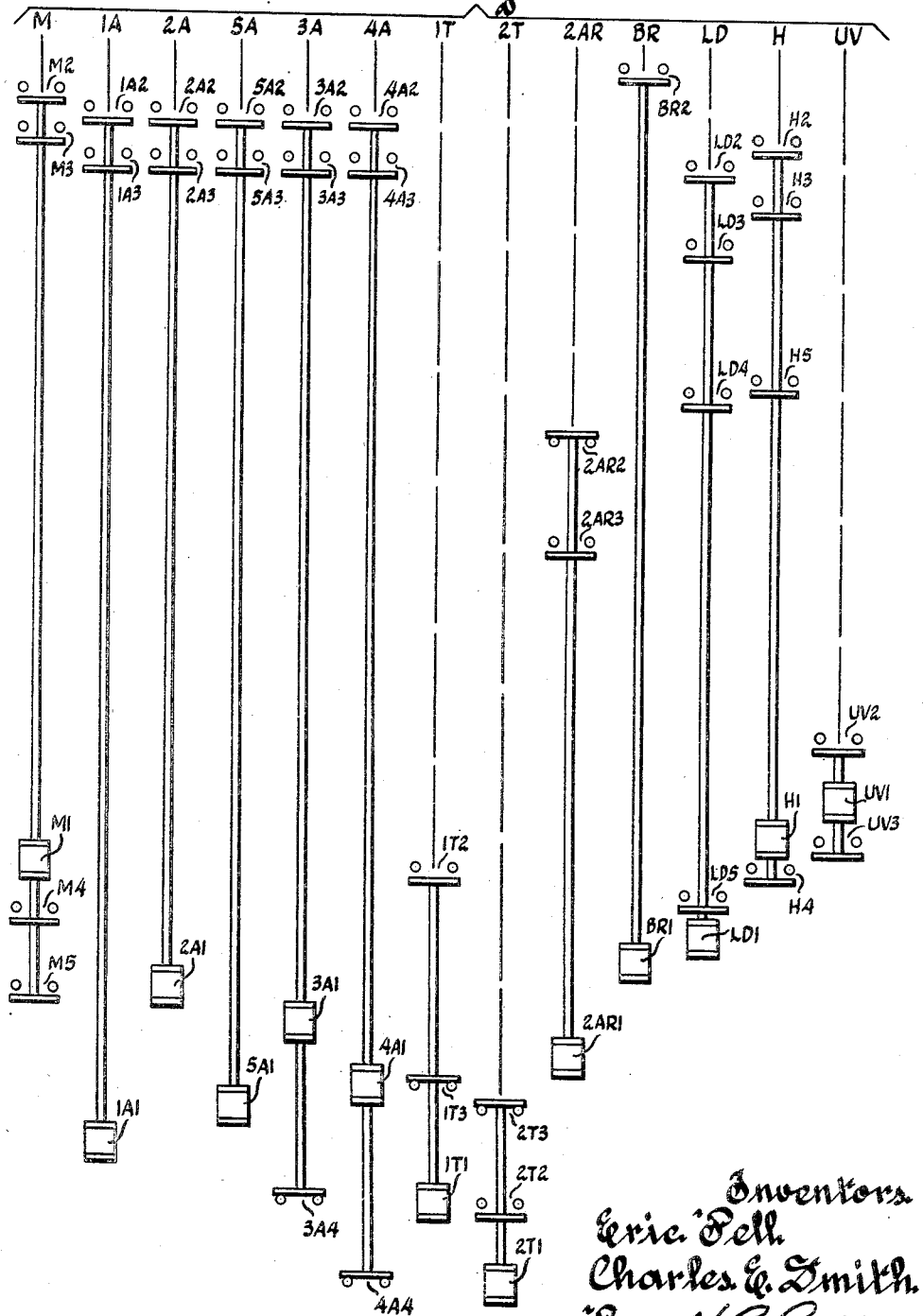
Fig. 2 is a schedule of contactors and relays shown in Fig. 1 with their respective contacts shown mechanically coupled to their operating windings.

Fig. 3 shows a modified form of the system wherein transformer CT and contacts H5 are dispensed with. In this form the input terminals of rectifier bridge 36 are connected directly across resistor $R_{3-4}$ by closure of 2L4 of a lowering contactor 2L, which is identical with contactor LD of the form shown of Figs. 1 and 2 with respect to its other contacts, connection of the same and its operating coil. The voltage drop across resistor $R_{3-4}$ will be proportional to the motor secondary current so that the rectified alternating voltage to which signal winding 25 is subjected will correspondingly vary proportionately to variation in motor secondary current. This arrangement of signal pick-off has the advantage over the use of current transformer CT in that it is not sensitive to frequency variations, and further the level of signal afforded is considerably higher over the operating range of the motor.

Fig. 4 depicts another modified form of control system wherever a transformer PT is used for signal pick-off from the motor primary. In this modified form, the closure of contact 3L3 of a contactor 3L, which is similar to the contactor 2L of Fig. 3, connects the primary of transformer PT across terminals P2, and P3 of motor 10 in all lowering positions of the controller 15. Consequently a voltage is induced in the secondary of transformer PT which is proportional to motor primary current. Thus under overhauling load conditions during lowering operations of the motor, the primary current will vary inversely with motor speed, and accordingly signal winding 25 of the amplifier will be subjected to a rectified alternating voltage which varies inversely with the motor speed.

It will be apparent that all forms of the invention hereinbefore described provide a "fail safe" energization of brake 13 in the event of failure in the circuit of signal winding 25 of the amplifier. In the event that either of the transformers CT or PT fail, or a secondary resistor fails the brake excitation will be increased to 100% to prevent overspeed of the hoist.

We claim:

1. In combination, a polyphase A. C. motor having a secondary resistance network, a self-saturating magnetic amplifier having A. C. input terminals, output terminals, and D. C. reference and signal windings, a torque resisting device mechanically connected to the shaft of said motor, an electroresponsive control winding in circuit with the output terminals of said amplifier, means supplying said reference winding with a constant unidirectional voltage which develops ampere turns in the latter sufficient to turn said amplifier on, means responsive to motor current to subject said signal winding to a unidirectional voltage proportional to motor current and of such a sense that the ampere turns developed by said signal winding act differentially with respect to those developed by said reference winding, means in circuit with said A. C. input terminals for supplying the same with an alternating voltage, control means operable to commutate portions of said secondary resistance in predetermined steps according to the direction of motor operation and means coordinated with the second specified means and said control means for rendering the unidirectional voltage supplied by said second specified means ineffective to energize said signal winding in all steps of said control means corresponding to one direction of motor operation.

2. The combination according to claim 1 together with means coordinated with the third specified means and said control means for reducing the magnitude of alternating voltage supplied to the input terminals of said amplifier in certain steps of operation of said control means and for disconnecting the input terminals of said amplifier from said alternating voltage in certain other steps of operation of said control means.

3. The combination according to claim 1 wherein said second specified means comprises a transformer having its primary winding connected in series with the resistance in a phase branch of said secondary resistance network and having its secondary winding connected in circuit with said amplifier signal winding.

4. The combination according to claim 1 wherein said second specified means comprises a rectified bridge having its input directly connected across a portion of the resistance in a phase branch of said secondary resistance network and having its output connected in circuit with said amplifier signal winding.

5. The combination according to claim 1 wherein said second specified means comprises a rectifier bridge having its primary winding connected in series with one of the motor primary leads and having its secondary winding connected in circuit with said amplifier signal winding.

6. A hoist system comprising a polyphase wound rotor motor having primary terminals and a secondary resistance circuit, means for establishing hoisting and lowering power connections to said primary terminals, an electric torque resisting device coupled to the shaft of said motor, a self-saturating magnetic amplifier having its output in circuit with said torque resisting device and having an A. C. input and D. C. reference and signal control windings, means for supplying said reference winding with a constant unidirectional voltage sufficient to turn said amplifier on, means in circuit with a phase branch of said secondary resistance circuit and the amplifier signal winding to supply the latter with a unidirectional voltage proportional to motor secondary current and of such sense as to counteract the effect of said reference winding energization, and control means coordinated with all of the aforementioned means comprising a multiposition controller operable in reverse direction, said controller in operation in one direction effecting hoisting power connections for said motor, commutating predetermined portions of said resistance network in predetermined consecutive operating position in said one direction, rendering the unidirectional voltage supplied by the third specified means ineffective to energize said amplifier signal winding in all operating positions in said one direction and effecting reduction of the magnitude of the A. C. voltage supplied to said amplifier in certain operating positions in said one direction and interrupting the supply of A. C. voltage to said amplifier in other operating positions in said one direction, and said controller in operation in its other direction effecting lowering power connections for said motor, providing commutation of said predetermined portions of said resistance network in predetermined consecutive operating position in its other direction, and effecting reduction of the magnitude of said A. C. voltage said predetermined amount in certain operating positions in its other direction.

References Cited in the file of this patent

UNITED STATES PATENTS 2,636,157    Pell                 Apr. 21, 1953
2,687,505    Schurr              Aug. 24, 1954